Nov. 24, 1953 — T. S. LASKY — 2,660,315
OIL FILTER
Filed Jan. 16, 1950 — 2 Sheets-Sheet 1
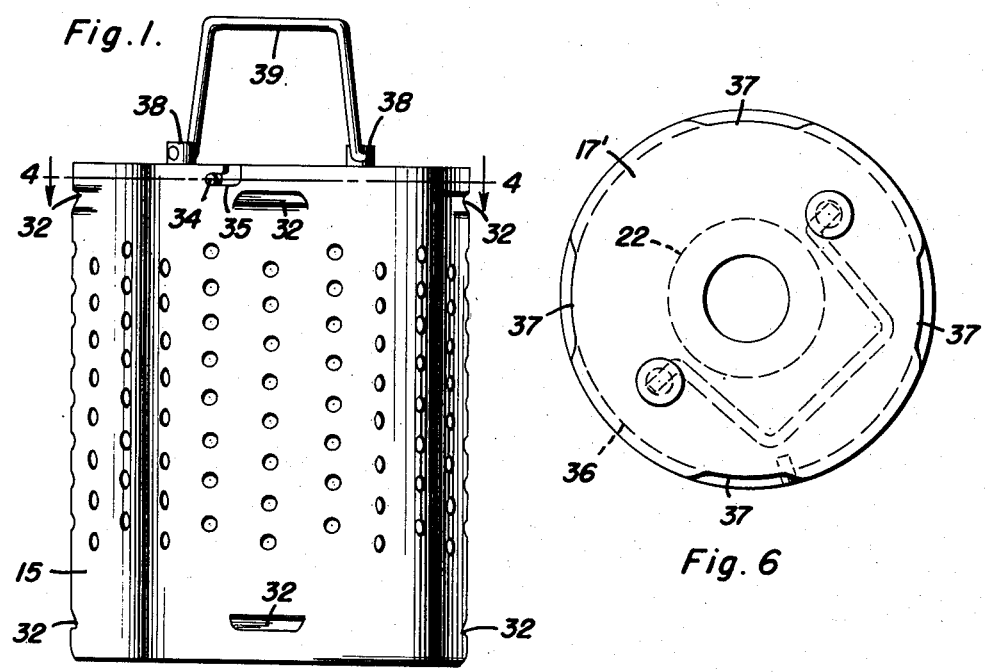
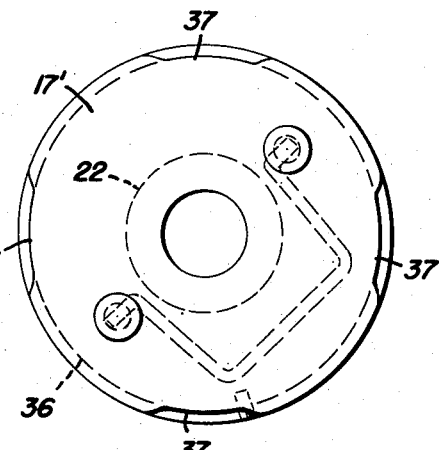
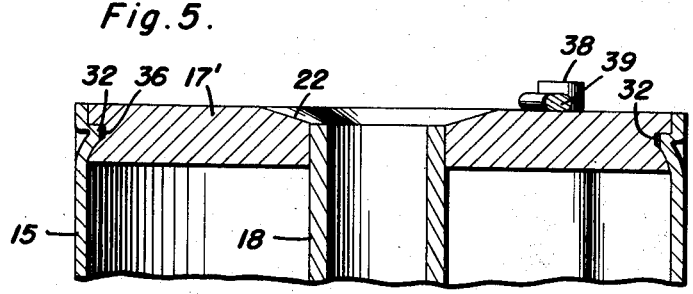
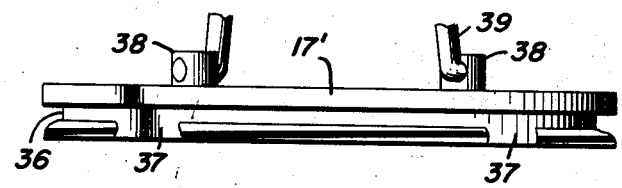
Thomas S. Lasky
INVENTOR.

Nov. 24, 1953
T. S. LASKY
2,660,315
OIL FILTER
Filed Jan. 16, 1950
2 Sheets-Sheet 2
Fig.2.
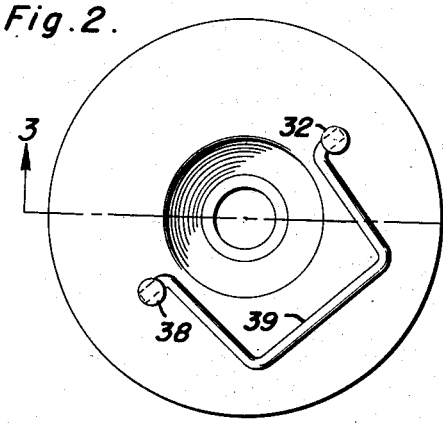
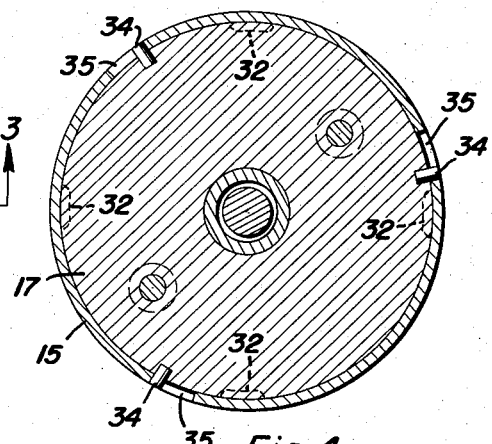
Fig.4.
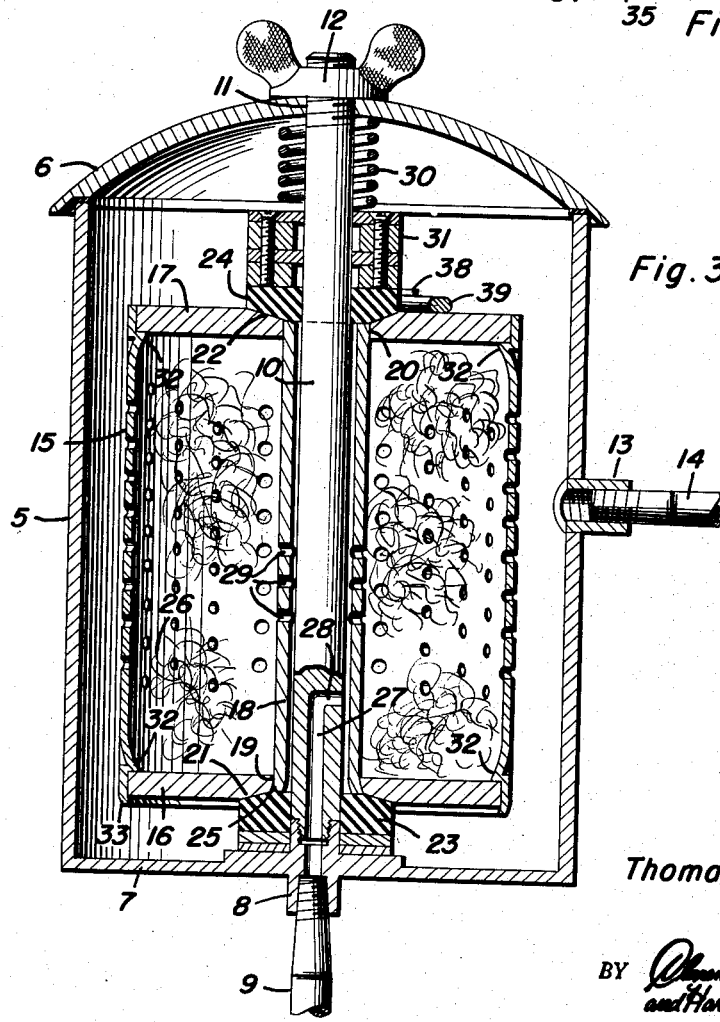
Fig.3.
Thomas S. Lasky
INVENTOR.
BY Clarence A. O'Brien
and Harvey B. Jacobson
Attorneys Patented Nov. 24, 1953

2,660,315

UNITED STATES PATENT OFFICE 2,660,315

OIL FILTER

Thomas S. Lasky, Kingston, Pa.

Application January 16, 1950, Serial No. 138,781

3 Claims. (Cl. 210—131)

This invention relates to oil filters such as are commonly used in connection with the lubricating systems of motor vehicles, and has more particular reference to an improved cartridge for such filters.

An object of the invention is to provide a cartridge which is simple and durable in construction, and which has a removable top closure disk which is securely held in place but readily removable to facilitate renewal of the filtering material therein.

Another object is to provide efficient means for preventing leakage of oil from the ends of the central tube of the cartridge about the central rod which forms part of means to hold the cartridge in spaced concentric relation to the filter casing and to hold the cover of the casing in place.

Other objects and features of the invention will be apparent from the following description when considered with the accompanying drawings, in which:

Figure 1 is an elevational view of a cartridge embodying the present invention.

Figure 2 is a top plan view thereof.

Figure 3 is a central vertical sectional view of a filter embodying a cartridge of the form shown in Figures 1 and 2.

Figure 4 is a horizontal section taken on the line 4—4 of Figure 1.

Figure 5 is a fragmentary central vertical sectional view of the upper portion of a cartridge, showing a modification of the means for securing the top closure disk in place.

Figure 6 is a bottom plan view of the closure disk shown in Figure 5.

Figure 7 is an elevational view of the closure disk shown in Figure 6.

Referring in detail to the drawings, 5 indicates the cup-shaped imperforate body of a cylindrical casing, and 6 the domed cover detachably secured on the top thereof. The bottom 7 of the casing body 5 has a central nipple 8 for connection with an oil conducting pipe 9. A rod 10 is fixed at its lower end to the bottom 7 of the casing body centrally of the latter, and this rod projects above the top of the body 5 and through a central opening 11 in the cover 6. A wing nut 12 is threaded on the upper end of rod 10 to removably secure the cover 6 on the body 5. The body 5 also has a side nipple 13 for connection with an oil conducting pipe 14.

Arranged within the casing is a cartridge including a cylindrical perforate shell 15, a relatively thick imperforate disk 16 fitted and permanently secured within the lower end of said shell 15, a relatively thick imperforate closure disk 17 removably fitted and secured within the upper end of said shell, and a central tube 18 fixed at its lower end in a central opening 19 of the disk 16 and projecting into a central opening 20 of the disk 17. The outer surfaces of the disks 16 and 17 are centrally recessed to form tapered seats 21 and 22 for the tapered faces of washers 23 and 24 snugly fitted on the rod 10. The ends of tube 18 terminate inwardly of the seats 21 and 22, and the lower end of said tube is flared or expanded as at 25 to fix it in the opening 19 of the disk 16. The shell 15 is adapted to be filled with filtering material 26, as usual.

The lower end of rod 10 is provided with an axial passage 27, the lower end of which communicates with the bore of nipple 8 and the upper end of which communicates with a transverse passage 28 extending to the periphery of said rod. Intermediate its ends, the tube 18 is provided with perforations 29. Thus, oil entering through either of the pipes 9 or 14 will pass through the filter to the other of said pipes.

The seat 21 in the bottom of the cartridge is pressed against the washer 23, and the washer 24 is pressed against the seat 22 in the top of the cartridge, by means of a helical spring 30 disposed on the rod 10 between the casing cover 6 and a combined oil seal and follower 31 slidably fitted on said rod and disposed on the washer 24. This holds the cartridge centered in the casing with the tube 18 in spaced concentric relation to the rod 10, and the washers 23 and 24 prevent escape of oil from the ends of tube 18 about the rod 10.

The shell 15 has series of inwardly embossed ribs 32 adjacent the ends thereof which provide stop shoulders on which the disks 16 and 17 seat. The lower end of the shell 15 is swaged inwardly as at 33 to secure the disk 16 in place.

Bayonet means is provided to removably secure the closure disk 17 in place, and in the form of Figures 1 to 4 inclusive, such means includes uniformly spaced radial pins 34 carried by and projecting from the peripheral edge of the disk 17 and coacting with angular slots 35 provided in and extending downwardly and laterally from the upper edge of the shell 15. In the form of Figures 5 to 7 inclusive, the closure disk 17' is provided with a peripheral groove 36 and uniformly spaced entrance grooves 37 leading from the groove 36 to the bottom of said disk through which the ribs 32 may pass. Thus, when the ribs 32 are alined with the grooves 37, the disk 17' may be inserted into the shell 15, whereupon the disk 17' may be turned to position the ribs 32 in groove 36 out of registry with the grooves 37 to secure the disk 17' in place. The same operation takes place when the pins 34 are registered with the vertical ends of slots 35 and then the disk 17 is turned to move said pins into the lateral portions of slots 35. In this way, the closure disk may be quickly applied or removed to facilitate renewal of the filtering material, a reversal of the operation resulting in quick removal of the closure disk. To facilitate turning of the closure disk, it is provided with diametrically opposed posts 38 in which are pivoted the ends of a bail-like folding handle 39.

From the foregoing description, the construction, operation and advantages of the present invention will be apparent to those skilled in the art.

What is claimed as new is:

1. For use in an oil filter of the type embodying an imperforate casing having a control rod provided at its lower end with an oil passage, a filter cartridge comprising a cylindrical shell adapted to contain a quantity of filtering material, said shell having lateral oil passages intermediate the ends thereof, said shell including a series of spaced inwardly embossed ribs adjacent each end thereof, said ribs providing supporting shoulders adjacent each end of said shell, a bottom disk seated on the shoulder adjacent the bottom of said shell, the lower end of said shell being swaged inwardly to permanently secure said bottom disk in place, a closure disk seated on the shoulder adjacent the top of said shell, a bayonet type joint between said closure disk and said shell, said disks being relatively thick with respect to said shell, said disks being provided with central apertures, a tapered washer seat in each of said disks about said central apertures, a tube fixed at its lower end in the central aperture of said bottom disk, the upper end of said tube being slidably and rotatably received in said central aperture of said closure disk.

2. For use in an oil filter having an imperforate casing including a removable cover, a rod secured to the bottom of the casing and extending through said cover and an axial passage in said rod terminating in a transverse passage intermediate the ends of the rod, a cartridge adapted to contain a quantity of filtering material comprising a perforate cylindrical shell, inwardly extending annular ribs adjacent each end of said shell, a first closure disk permanently secured on one of said ribs, said first closure disk having a central aperture, a tube fixed in said central aperture and extending in said shell, said tube being perforated intermediate its ends, a second closure disk removably seated on the other of said ribs, a bayonet connection between said shell and said second closure disk, said second closure disk having a central aperture, said tube extending into said aperture of said second closure disk, a tapered washer seat about said central apertures in each of said closure disks, each of said washer seats being adapted to receive a resilient sealing washer for sealing the space between said rod and said disks.

3. For use in an oil filter of the type having a central inlet and support rod for mounting a filter, a filter retaining cartridge comprising a perforated cylindrical shell, inwardly extended ribs providing stop shoulders adjacent each end of said shell, a bottom disk mounted on one of said shoulders, the adjacent edge of said shell being inturned over said bottom disk, said bottom disk having an axial aperture, a tube rigidly secured in said aperture and extending axially in said shell, a closure disk seated on the other shoulder, a detachable bayonet type connection between said closure disk and said shell, said closure disk having an axial aperture, said tube extending into said axial aperture of said closure disk, said bottom disk and said closure disk each having a sloping washer seat formed in communication with the axial aperture thereof, each of said washer seats being adapted to receive a tapered resilient sealing washer for sealing the space between said washer seat and the inlet rod.

THOMAS S. LASKY.

References Cited in the file of this patent.

UNITED STATES PATENTS

| Number | Name | Date |
|---|---|---|
| 1,348,536 | Billings et al. | Aug. 3, 1920 |
| 1,502,124 | Schaefer | July 22, 1924 |
| 1,814,572 | Shaffer | July 14, 1931 |
| 1,839,350 | Slagel | Jan. 5, 1932 |
| 2,057,932 | Bolser | Oct. 20, 1936 |
| 2,100,951 | Glass et al. | Nov. 30, 1937 |
| 2,112,439 | Graff et al. | Mar. 29, 1938 |
| 2,201,418 | Williams et al. | May 21, 1940 |
| 2,381,141 | Russell | Aug. 7, 1945 |
| 2,427,320 | Zech | Sept. 9, 1947 |
| 2,487,146 | Lasky | Nov. 8, 1949 |
| 2,559,133 | Schultz | July 3, 1951 |
| 2,568,181 | Zimmerman et al. | Sept 18, 1951 |
| 2,584,771 | Wilkinson | Feb. 5, 1952 |